United States Patent [19]

Swapp et al.

[11] Patent Number: 4,704,735
[45] Date of Patent: Nov. 3, 1987

[54] SYSTEM AND METHOD FOR AUTOMATIC REMOTE ACTIVATION OF AN EARTH-BASED SATELLITE TRANSMITTER

[75] Inventors: Mavin C. Swapp; David W. Beaty, both of Mesa, Ariz.

[73] Assignee: Telonics, Inc., Mesa, Ariz.

[21] Appl. No.: 776,020

[22] Filed: Sep. 12, 1985

[51] Int. Cl.$^4$ .......................... H04B 1/04; H04B 7/00
[52] U.S. Cl. ........................................ 455/68; 455/77; 455/92; 455/127; 455/12; 340/870.11; 340/870.28; 340/870.39; 340/825.72
[58] Field of Search ...................... 455/12, 49, 68, 69, 455/73, 77, 88, 92, 127, 166; 340/870.11, 870.28, 870.39, 825.54, 825.72; 343/6.5 R, 6.5 SS, 6.8 R, 7.5

[56] References Cited

U.S. PATENT DOCUMENTS

| | | | |
|---|---|---|---|
| 2,818,502 | 12/1957 | Steward | 455/92 |
| 2,864,943 | 12/1958 | Schultz | 340/825.54 |
| 3,470,481 | 9/1969 | Myers et al. | 455/166 |
| 3,967,202 | 6/1976 | Batz | 455/92 |
| 4,398,286 | 8/1983 | Geesen et al. | 370/69 |
| 4,449,248 | 5/1984 | Leslie et al. | 455/343 |
| 4,479,125 | 10/1984 | Mori | 340/825 |
| 4,479,255 | 10/1984 | Geesen et al. | 455/246 |
| 4,484,356 | 11/1985 | Geesen et al. | 455/165 |

OTHER PUBLICATIONS

"Data Flow in the Synchronous Meteorological Satellite System" by Ames et al. 10/1970.

Primary Examiner—Jin F. Ng
Attorney, Agent, or Firm—Workman, Nydegger & Jensen

[57] ABSTRACT

A system and method for detecting when a satellite is within range of a small, battery-operated, portable transmitter so as to activate the transmitter only when the satellite is within range of the transmitter. The electronic system utilizes a sensitive radio-frequency receiver which can be tuned to receive a unique down-link signal from the orbiting satellite. The signal is amplified and demodulated and then input to a microprocessor. Information is stored in the memory of the microprocessor which identifies the unique down-link signal. The microprocessor compares the demodulated signal with the stored signal and if the two match, the earth-based transmitter is turned on and allowed to transmit for an interval of time. The microprocessor is maintained in a normally "full-stop" mode wherein power to the microprocessor is essentially turned off, and the microprocessor is periodically switched on so that it can check for the presence of the uniquely identifiable down-link signal which triggers transmission.

29 Claims, 4 Drawing Figures

SYSTEM AND METHOD FOR AUTOMATIC REMOTE ACTIVATION OF AN EARTH-BASED SATELLITE TRANSMITTER

BACKGROUND

1. The Field of the Invention

The invention relates to earth-based satellite transmitters, and more particularly to a system and method for automatically activating a remote battery-operated earth-based satellite transmitter in response to a signal detected from an orbiting satellite.

2. The Prior Art

Satellite systems have increasingly become an important link in global telecommunication systems. Earth-orbiting satellites are now commonplace and have a wide variety of applications, including the relaying of video, audio and data information between stationary earth-based transmitting and receiving stations.

Of particular interest in connection with this invention is the ARGOS satellite system, which is administered jointly by the United States, Canada and France. The ARGOS system is composed of two polar-orbiting satellites, a network of ground tracking/command and control stations and a worldwide data dissemination system.

The primary mission of the ARGOS system is to provide scientific data regarding weather conditions, atmospheric and sea surface information, particularly in the polar regions of the earth above eighty degrees north and south latitudes, due to the fact that geostationary satellites are not able to "see" these regions of the earth because of the curvature of the earth's surface.

The two polar-orbiting satellites of the ARGOS system orbit the earth every 102 minutes at an inclination of ninety-eight degrees with respect to the earth's equator, passing near the poles with each revolution. The earth rotates or precesses approximately twenty-five degrees during each orbital period, providing full global coverage by each satellite once every twenty-four hours. The orbits of the two satellites are alternated in such a way that one satellite makes a series of passes over any given point an the earth in the early morning hours, while the other satellite provides a series of excellent passes over the same point in the late afternoon hours. This assures good, low-angle, high-contrast photos for surface feature recognition. Feature recognition is necessary in order to overlay a map outline, or "grid" the surface of the earth with latitude/longitude lines on weather photos.

A secondary mission of these two satellites of the ARGOS system is to carry a special data collection system. The data collection system consists of specialized receivers which listen continuously for transmissions from any of thousands of small transmitters (sometimes called "platform terminal transmitters" or "PTT's") which may be scattered about the surface of the earth. These small, remote transmitters are used to send a variety of meteorological, environmental and geophysical data from varying locations. Currently the ARGOS satellite system is the only system capable of full global coverage, thus making it especially significant with respect to collection of data from these remotely scattered transmitters. The data collection system on board the ARGOS system satellites checks, sorts and formats all data from the earth transmitters, and stores the information for later transmission upon command as the satellites pass over one of the ground tracking stations.

A major problem affecting the operational life of the small PTT transmitters which are scattered around the earth is the limited life of the small, portable battery packs which power them. The present technological approach to extending the transmitter life is to time each period of transmission such that the transmitter is allowed to operate only a specified number of hours a day, a number of days per week, month and so forth. During the time the transmitter is on, it actually sends a short transmission (typically less than one second in length) at regular intervals, ranging from 40-60 seconds. The length of time between transmissions is determined by whether or not the ARGOS satellite system is to receive data only from the transmitter, or whether the satellite system is actually to calculate the position of a transmitter on the earth's surface.

Since such PTT transmitters are battery operated, an operational life of a few weeks is considered to be very good. Large battery packs, such as may be placed in drifting ocean buoys when such PTT's are used to track ocean currents, have provided a maximum of from three to nine months operating life. However, PTT transmitters which require smaller battery packs, such as those used in tracking certain kinds of migratory animals, have a much shorter operational life. Since the orbital period of each ARGOS satellite is 102 minutes, and the altitude of their essentially circular orbit is approximately 820 kilometers, the maximum time of an overpass relative to a PTT transmitter unit is approximately sixteen minutes or less. Thus, using present technology the small transmitters must actually transmit continuously, even when no satellites are available for reception, which is typically a very large percentage of the time.

If a transmitter's position on the earth were accurately known, a complex computer program could predict the overpass times of each ARGOS satellite. However, such predictions remain valid for relatively short periods, typically on the order of weeks or a few months at best, due to the decay and/or forced corrections of the orbit of each spacecraft. Furthermore, in the case of PTT transmitters which are mounted on or carried by objects which move great distances, such as ships, migratory animals, weather balloons, floating buoys, etc., the time of a given satellite overpass is virtually impossible to predict because the position of the transmitter is constantly changing.

In summary, the use of PTT transmitters for tracking ocean currents, migratory animals or other such applications has been significantly limited because of the problem of limited battery life. This is due to the fact that much of the transmitted power of the PTT is wasted because of the need to transmit on a continuous or frequent basis in order to assure that such transmissions will be picked up by one of the ARGOS satellites as it passes over the transmitter.

BRIEF SUMMARY AND OBJECTS OF THE INVENTION

In view of the shortcomings of the present state of the art as explained above, it is a primary object of the present invention to provide a system and method which will allow a small, battery-operated portable transmitter to detect when a satellite is passing over the transmitter so that the transmitter will be activated to provide transmissions only during that period of time when the satellite is within range of the transmitter's signal.

Another important object of the present invention is to provide a system and method for automatic, remote activation of an earth-based satellite transmitter which greatly minimizes power consumption thereby significantly extending the operational life of such transmitters.

Yet another important object of the system and method of the present invention is to provide a small, battery-operated portable transmitter in conjunction with a remotely switchable receiver for activating the transmitter in response to a unique signal detected from a passing satellite.

Another object of the present invention is to provide a battery-operated transmitter which is small, portable and which can be used to track ocean currents or migratory animals or the like over extended periods of time.

The foregoing and other objects and features of the present invention are realized in a system and method for detecting when a satellite is within range of a small, battery-operated, portable transmitter so as to activate the transmitter only when the satellite is within range of the transmitter. The electronic system, which incorporates the method, utilizes a sensitive radio-frequency receiver which can be tuned to receive a unique signal from the satellite. The signal is amplified and demodulated and then input to a microprocessor. The microprocessor has an erasable, programmable read-only memory in which information is stored that identifies the unique down-link signal. The microprocessor thus compares the demodulated signal with the stored signal. If the demodulated signal and the stored signal match, the earth-based transmitter is turned on and allowed to transmit for an interval of time. In order to provide even greater conservation of limited battery power, the microprocessor is normally kept in a low power consumption mode and is provided with a timer to periodically cause the system to check for the unique satellite signal.

DETAILED DESCRIPTION OF THE PRESENTLY PREFERRED EMBODIMENT

Figure 1:
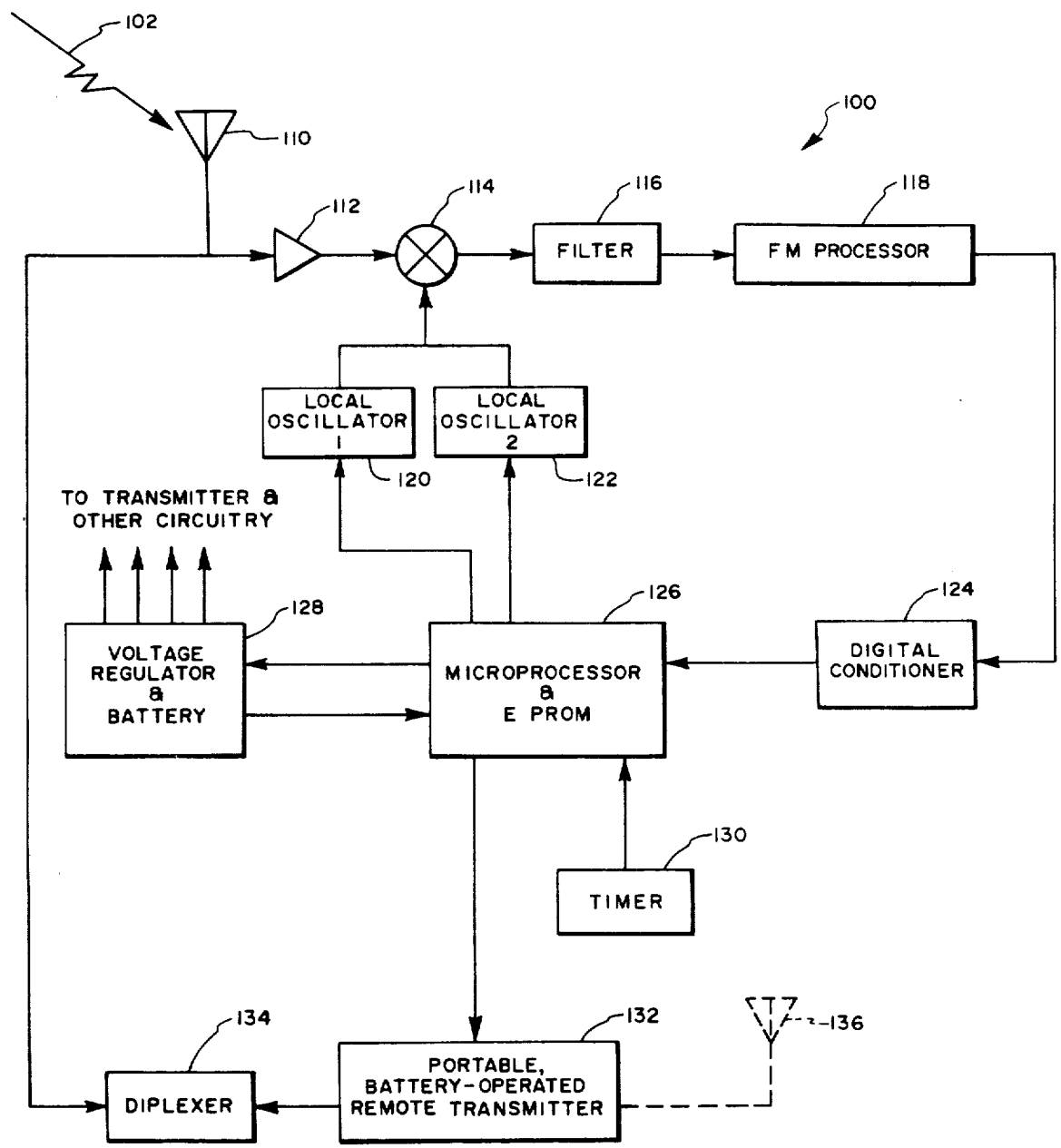
FIG. 1 is a block diagram showing the major functional elements of the presently preferred embodiment of the present invention.

Reference is next made to the drawing wherein like parts are designated with like numerals throughout. The overall operation of the system can best be explained by reference to FIG. 1 and the function of each of the blocks shown.

One presently preferred embodiment of the system is generally designated at 100. The arrow 102 represents a unique down-link radio-frequency signal which is transmitted by an earth-orbiting satellite which is adapted for receiving and relaying data transmitted from a portable, battery-operated transmitter such as a PTT. For example, one satellite system presently in use which provides global coverage and is thus well-suited to receive and relay data transmitted from such a PTT is the ARGOS satellite system, described above.

One of the features of the ARGOS satellite system is that each satellite transmits facsimile weather photos on a continuous basis for analysis by the National Weather Service and the World Meteorological Organization. These continuous, real-time transmissions, called "automatic picture transmissions" ("APTs"), can be used to uniquely identify each of the ARGOS satellites. The ARGOS APT signal characteristics are generally described in Table 1 below, while the specific transmission parameters are indicated in Table 2. The ARGOS APT signal-format parameters are set forth in Tables 3–6.

The APT signal comprises a series of periodically spaced square waves which serve as synchronization pulses (see Table 6). Such sync pulses as found in the ARGOS APT signal and the down-link signals of many other earth-orbiting satellites provide an ideal wave form for identification and manipulation by digital electronic techniques.

TABLE 1

| APT CHARACTERISTICS | |
|---|---|
| Characteristic | Technical Description |
| Line rate (lines per minute) | 120 |
| Data resolution | 4 km uniform |
| Carrier modulation | analog |
| Transmit frequency | 137.50 MHz |
|  | 137.62 MHz |
| Transmit power | 5 watts |
| Transmit antenna polarization | right hand circular |
| Subcarrier frequency | 2.4 KHz |
| Carrier deviation | ±17 KHz |
| Ground station low pass filter | 1400 Hz 7th order linear recommended |
| Synchronization | 7 pulses at 1040 pps, 50% duty cycle for Channel A; 7 pulses at 832 pps, 60% duty cycle for Channel B |

TABLE 2

| APT TRANSMISSION PARAMETERS | |
|---|---|
| Type of transmitted signal | VHF, AM/FM 2.4 KHz DSB-AM 1.44 Hz video |
| System output | |
| Frequency polarization | 137.50 MHz right circular polarization or 137.62 MHz right circular polarization |
| EIRP at 63° from nadir | 32.8 dbm worst case 37.2 dbm nominal |
| Antenna | |
| Gain at 63° from nadir | −0.5 dbi, right circular polarization |
| Ellipticity | 5.0 dB, maximum |
| Circuit Losses | 2.4 dB |
| Transmitter | |
| Power | 5.0 watts minimum |
| Carrier Modulation Index | ±17, ±0.85 KHz |
| Premodulation bandwidth ±0.5 dB | 0.1 to 4.8 KHz |
| Frequency Stability | $+2 \times 10^{-5}$ |
| Subcarrier Modulator | |
| Subcarrier frequency | 2400 ±0.3 Hz |
| Subcarrier Modulation Index | 87 ±5% |
| Post Modulator Filer, type | 3 pole Butterworth |
| 3 dB bandwidth | 6 KHz, minimum |
| Pre-Modulator Filter, type | 3 pole Butterworth-Thompson |
| 3 dB bandwidth | 2.4 KHz, minimum |

TABLE 3

APT Format Parameters

| | |
|---|---|
| Frame | |
| Rate | 1 frame per 64 seconds |
| Format | See Table 4 |
| Line | 128 lines |
| Rate | 2 lines/second |
| Number of words | 2080 |
| Number of sensor channels | Any 2 of the 5; selected by command |
| Number of words/sensor channel | 909 |
| Format | See Table 5 |
| Line sync format | See Table 6 |
| Word | |
| Rate | 4160 per second |
| Analog-to-Digital Conversion Accuracy | The 8 MSB's* of each 10 bit AVHRR word |
| Low Pass Filter | |
| Type | 3rd order Butterworth-Thompson |
| 3 dB bandwidth | 2400 Hz |

*Most Significant Bits (MSBs)

TABLE 4

APT VIDEO LINE FORMAT (PRIOR TO D/A CONVERTER)

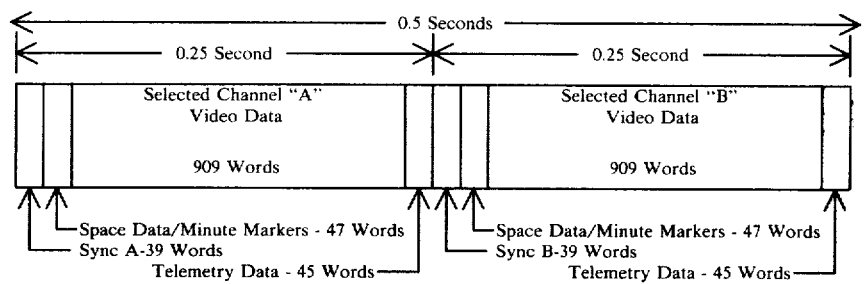

Notes:
(1) Equivalent Output Digital Data Rate is 4610 Words/Second.
(2) Video Line Rate - 2 Lines/Second
(3) APT Frame Size - 128 Lines.
(4) Any two of the five AVHRR channels may be selected for use.
(5) Sync A is a 1040 Hz square wave - 7 cycles.
(6) Sync B is a 832 pps pulse train - 7 pulses.
(7) Each of 16 telemetry points are repeated on 8 successive lines.
(8) Minute markers are repeated on 4 successive lines, with 2 lines black and 2 lines white.

TABLE 5

APT FRAME FORMAT

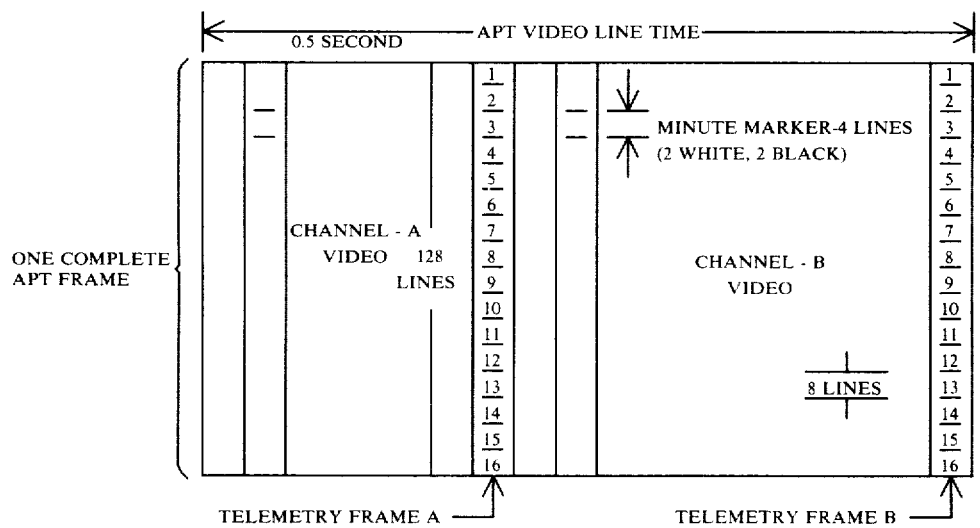

TABLE 5-continued

APT FRAME FORMAT

| ONE COMPLETE TELEMETRY FRAME | *M1=10.9% WEDGE 1 | M1=21.5% WEDGE 2 | M1=32.4% WEDGE 3 | M1=43.3% WEDGE 4 | M1=54.2% WEDGE 5 | M1=65.2% WEDGE 6 | M1=76.0% WEDGE 7 | M1=87.0% WEDGE 8 |
|---|---|---|---|---|---|---|---|---|
| | 1 | 2 | 3 | 4 | 5 | 6 | 7 | 8 |
| | ZERO MODULATION REFERENCE M1=0.0% | THERM. TEMP. 1 | THERM. TEMP. 2 | THERM. TEMP. 3 | THERM. TEMP. 4 | PATCH TEMP. | BACK SCAN | CHANNEL ID WEDGE |
| | 9 | 10 | 11 | 12 | 13 | 14 | 15 | |

*M1 = MODULATION INDEX

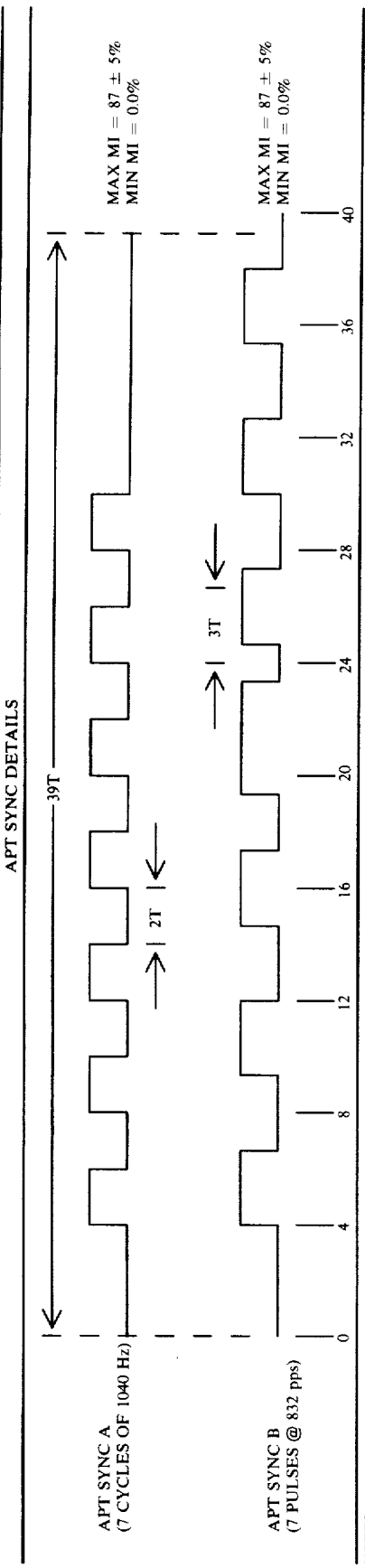
TABLE 6
APT SYNC DETAILS
NOTES:
(1) T = $\frac{1}{4160}$ = 0.24038 MILLISECOND
(2) SYNC A PRECEDES CHANNEL-A DATA
(3) SYNC A PRECEDES CHANNEL-B DATA As noted above, the ARGOS satellite system is of particular interest in connection with the type of small, battery-operated portable transmitters which are used for purposes of tracking ocean currents or migratory animals or in other such applications where the transmitters will be frequently moved from one location to another. This is because the ARGOS satellite system is the only system currently available which permits total global coverage. However, the system and method of the present invention are not intended to be limited to use with the ARGOS satellite system. Clearly, other satellite systems could be used in accordance with the objects and principles of the present invention as described and claimed herein. Thus, the ARGOS satellite system is simply intended to illustrate one presently preferred satellite system with which the system and method of the present invention can be implemented.

Referring again to FIG. 1, in the case of the ARGOS satellite system, the broken arrow 102 shown in FIG. 1 represents the unique APT signal that is continuously transmitted from each of the ARGOS satellites. Each of the ARGOS satellites transmits this signal on a different radio frequency, one satellite transmitting at 136.770 MHz and the other at 137.770 MHz. As hereinafter more fully explained, it is this unique APT signal which is selected and used to identify the satellite intended to receive PTT transmissions. In other words, the signal that is selected and used in accordance with the system and method of the invention is a unique radio-frequency signal which is used to identify a particular satellite or group of satellites; the essential characteristic of the earth-orbiting satellite used with the present invention is that it must transmit, at least periodically, a uniquely identifiable signal.

Referring again to FIG. 1, the ARGOS system APT signal 102 is received by an antenna 110. The signal from antenna 110 us applied to the input of a radio-frequency amplifier 112. The amplifier 112 provides approximately 8-12 dB of gain. The output of the amplifier 112 is applied to a first mixer 114. In the presently preferred embodiment, one of two local oscillators 120 or 122, which together comprise a local oscillator stage, are selectively input to mixer 114 under the control of a microprocessor 126. The frequency of the local oscillators 120 and 122 are selected so as to provide a radio-frequency signal which, when input with the APT signal into the mixer 114, will produce a first intermediate-frequency signal which, in the presently preferred embodiment, is 10.7 MHz. The mixer 114 is designed so as to provide approximately 8-12 dB of gain.

Two local oscillators 120 and 122 are provided in the presently preferred embodiment so as to be able to generate the 10.7 MHz intermediate-frequency signal using either of the two ARGOS APT signal frequencies (e.g., 136.770 MHz or 137.77 MHz). Accordingly, one of the local oscillators 120 provides a 126.07 MHz signal which, when subtracted by mixer 114 from the 136.770 MHz ARGOS signal will provide the desired 10.7 MHz intermediate-frequency signal. Similarly, local oscillator 122 is designed to provide a 127.07 MHz signal which, when subtracted by mixer 114 from the 137.770 MHz ARGOS APT signal, will also provide the desired 10.7 MHz intermediate-frequency signal.

Once the ARGOS APT signal has been received by antenna 110, has been amplified by the radio-frequency amplifier 112 and has been mixed with a local oscillator frequency in mixer 114 so as to provide a first intermediate-frequency signal of 10.7 MHz, the intermediate-frequency signal is filtered. Filter 116 may comprise, for example, a tuned transformer which filters all frequencies except the desired 10.7 MHz signal.

The filtered signal is next applied to a frequency modulation (FM) processor 118. In the presently preferred embodiment, the FM processor 118 may comprise a conventional integrated circuit (described more fully below) which, along with associated external components, carries out two principal functions. The first principal function is that of serving as a second mixer by mixing the first intermediate-frequency signal with a 10.245 MHz radio-frequency signal so as to provide a second intermediate-frequency signal of 455 KHz. The second principal function of the FM processor 118 is to demodulate the second imtermediate-frequency. The FM processor 118 also provides 80 to 110 dB of gain, with the remainder of the radio-frequency components providing approximately 18 to 22 dB of gain, resulting in an overall gain in the presently preferred embodiment of between 98 and 122 dB. Providing this amount of gain is important, as will be explained in detail later, due to the very weak down-link signal 102.

A digital conditioner 124 receives the demodulated signal from the output of FM processor 118. Digital conditioner 124 performs primarily a pulse-timing function; that is, the frequency of the signal received from FM processor 118 is slowed down by a factor of 16 (e.g., the sync pulses are slowed to a frequency that is 1/16 of their original frequency). The slower pulse timing is provided to allow the microprocessor 126 to operate at a slower clock rate as will be explained later. In the presently preferred embodiment, digital conditioner 124 is a divide-by-sixteen digital frequency divider.

In addition to the pulse-timing function, digital conditioner 124 may also provide a wave-shaping function so as to ensure that the pulses of the demodulated signal are "clean" square waves (i.e., have sharply rising leading and trailing edges) before the pulses are applied to the microprocessor unit 126. This helps to prevent data errors and misinterpretation of the down-link signal 102.

Microprocessor 126 in the presently preferred embodiment is a microprocessor with an integral ultraviolet erasable programmable read-only memory (UV EPROM). Since conservation of battery power is essential the presently preferred embodiment incorporates a microprocessor which not only consumes very little power during operation but also provides a "full-stop" mode in which a negligible amount of battery power is consumed. Also the microprocessor 126 can be operated or clocked at a rate anywhere between DC and 4 MHz, such operation at low frequency acting to further reduce the power consumption of the microprocessor 126.

Figure 2:
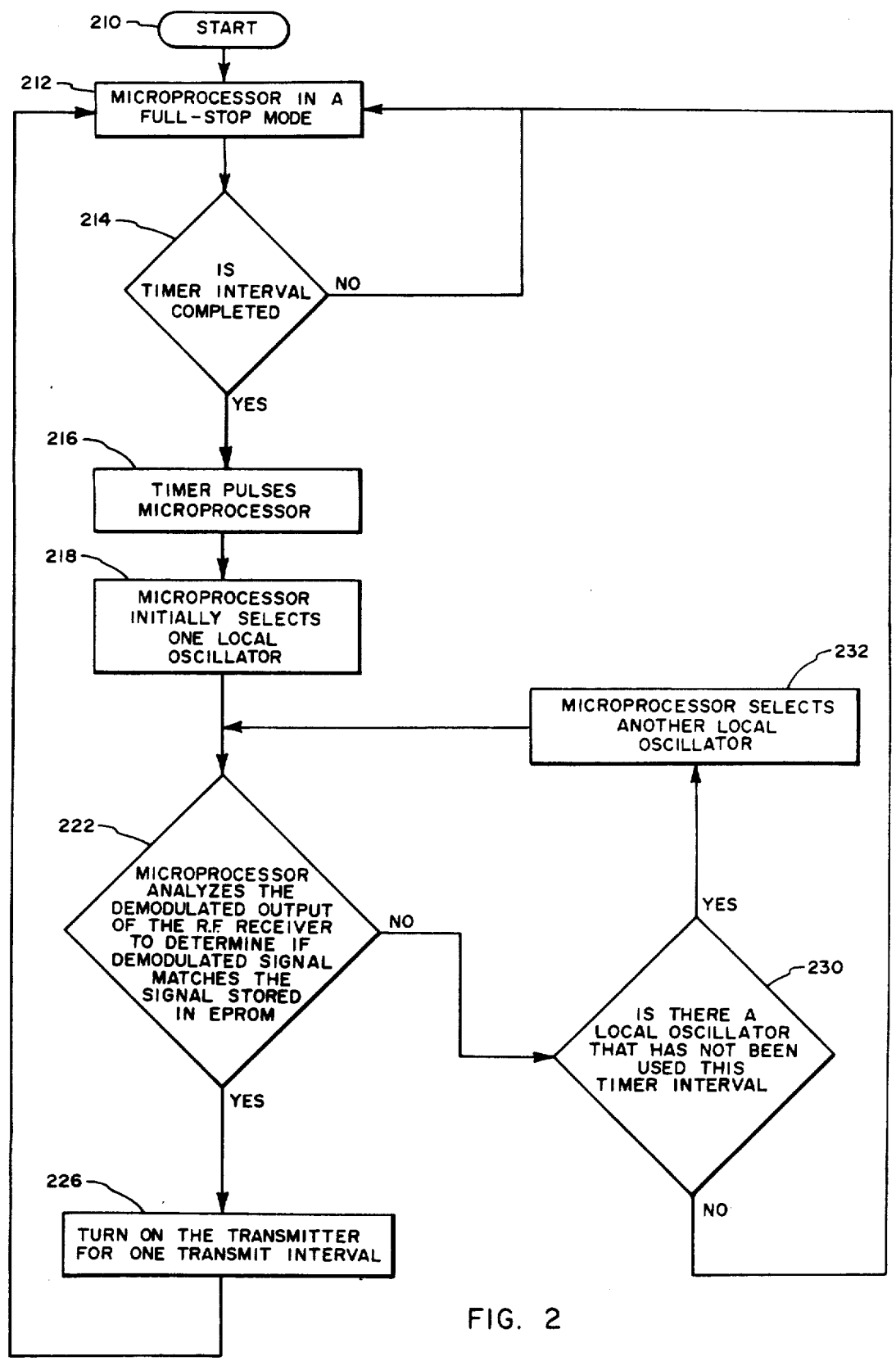
FIG. 2 is a flow chart showing one embodiment of the method of the present invention.

The read-only memory provides non-volatile storage of information representing the unique down-link signal 102, and also storage of the operating instructions for the microprocessor 126, as described more fully in connection with FIG. 2. With the information supplied from the read-only memory, the microprocessor 126 compares the demodulated signal which is input from the digital conditioner 124 with the selected down-link signal represented by the information contained in the read-only memory. If the two signals match, the microprocessor then "knows" that a satellite intended to receive transmissions is within range. Use of an erasable and programmable read-only memory provides the further advantage of allowing the system to be used with different satellites. The information representing the selected down-link signal of a different satellite may be easily programmed into the read-only memory using techniques well-known in the art.

The microprocessor unit 126 also controls which local oscillator 120 or 122 is input to mixer 114. For example, in the presently preferred embodiment, if the signal stored in the read-only memory does not match the demodulated signal from the digital conditioner 124 when the first local oscillator 120 is operating, microprocessor 126 will turn off the first local oscillator 120 and turn on the second local oscillator 122. In this way, each of the two frequencies upon which the ARGOS APT signal is transmited can be sequentially checked for the presence of the selected down-link signal.

While the presently preferred embodiment is equipped with only two local oscillators due to the fact that only two satellites are used in the ARGOS system, it is within the scope of the present invention to include only one or any number of local oscillators so as to allow the radio-frequency stages of the present invention to receive and demodulate radio-frequency signals on one or any of a plurality of frequencies. Furthermore, it is within the scope of the present invention to provide the read-only memory with information representing more than one particular down-link signal. Still further, it will be appreciated that a microprocessor could be provided which would select one of a plurality of local oscillators to allow reception and demodulation of one of a plurality of radio-frequency signals and then compare the demodulated signal with one or more selected signals stored in a plurality of read-only memories.

If microprocessor stage 126 determines that an earth-orbiting satellite is within range, the microprocessor 126 will then activate the transmitter 132 for one transmit interval. For example, in the presently preferred embodiment the transmit interval is typically one minute, with such intervals repeating somewhere between two and sixteen times, depending on how long the ARGOS satellite is within range of a transmitter. Transmitter 132 sends the signal from antenna 110, which is coupled to transmitter 132 by a conventional diplexer 134. This permits antenna 110 to be used to both receive and send RF signals, as needed. Alternatively, a second antenna 136 could be used for transmissions from transmitter 134.

In order to further reduce power consumption, the microprocessor 126 is normally kept in its full-stop mode. The timer 130 periodically activates the microprocessor 126 by switching the microprocessor 126 from the full-stop mode to an operating mode. The rate at which microprocessor 126 is turned on is typically very low (once per second). This ensures that highly selective narrow-bank circuitry can be utilized for maximum sensitivity to the selected down-link signal, and low power consumption.

Importantly, it should be noted that even when operating, microprocessor 126 does not necessarily cause the transmitter 132 to send a signal. Rather, the microprocessor 126 first checks to see if the required down-link signal is detected. Thus, unlike prior-art type transmitters, no transmission occurs until the down-link signal is received and identified. Accordingly, consumption of battery power can be significantly reduced using the system of the present invention, thus extending the operational life of the transmitter by as much as three to fifteen times over that which is currently available in the art.

Long operational life of a transmitter is critical in some applications. For example, studies of ocean currents will require a life of two to three full years for a transmitter placed on a buoy, in order to complete a full, global drift cycle.

Reference will now be made to FIG. 2 for a detailed description of the method incorporated into the presently preferred embodiment. FIG. 2 is a flow chart showing the steps which are programmed into the microprocessor's EPROM, and which are carried out by the microprocessor 126 in controlling the other circuit elements shown in FIG. 1.

Step 210 indicates the starting point. As explained above, and as shown in the step labeled 212, the microprocessor 126 is normally kept in a full-stop mode during which its consumption of battery power is negligible. As indicated at step 214, the timer 130 determines if a timer interval has been completed. If an interval has not been completed, the microprocessor does not change from the full-stop mode into an operating mode but continues to remain in the full-stop mode. If the selected timer interval has been completed, the pulse from timer 130 causes the microprocessor 126 to switch on, bringing it into an operating mode as indicated at step 216.

The microprocessor 126 then selects one of the local oscillators 120 or 122. The step of selecting the first local oscillator is shown at 220 of FIG. 2. The microprocessor 126 then compares the demodulated signal output from digital conditioner 124 to determine if it matches the unique down-link signal represented by the information stored in the read-only memory as explained above, the comparison step being shown at 222 of FIG. 2.

If the demodulated signal does not match the stored down-link signal, the microprocessor 126 will determine if all local oscillators have been used during the present timer interval, as shown at step 230 of FIG. 2. If there is a local oscillator that has not been turned on during the present timer interval, the microprocessor 126 will select another local oscillator, as shown at step 232, and the microprocessor 126 will repeat the steps found after step 220. If all the local oscillators have been turned on during the present timer interval, the microprocessor 126 will return to a full-stop mode as shown at step 212 until another timer interval has passed, at which time the timer 130 will switch on the microprocessor 126 once again.

From step 224, if the demodulated signal matches the stored signal, the microprocessor 126 will instruct the transmitter 132 to transmit for one transmit interval, which in the presently preferred embodiment is approximately sixteen minutes. Afterwards, microprocessor 126 returns to the full-stop mode (step 212).

Figure 3:
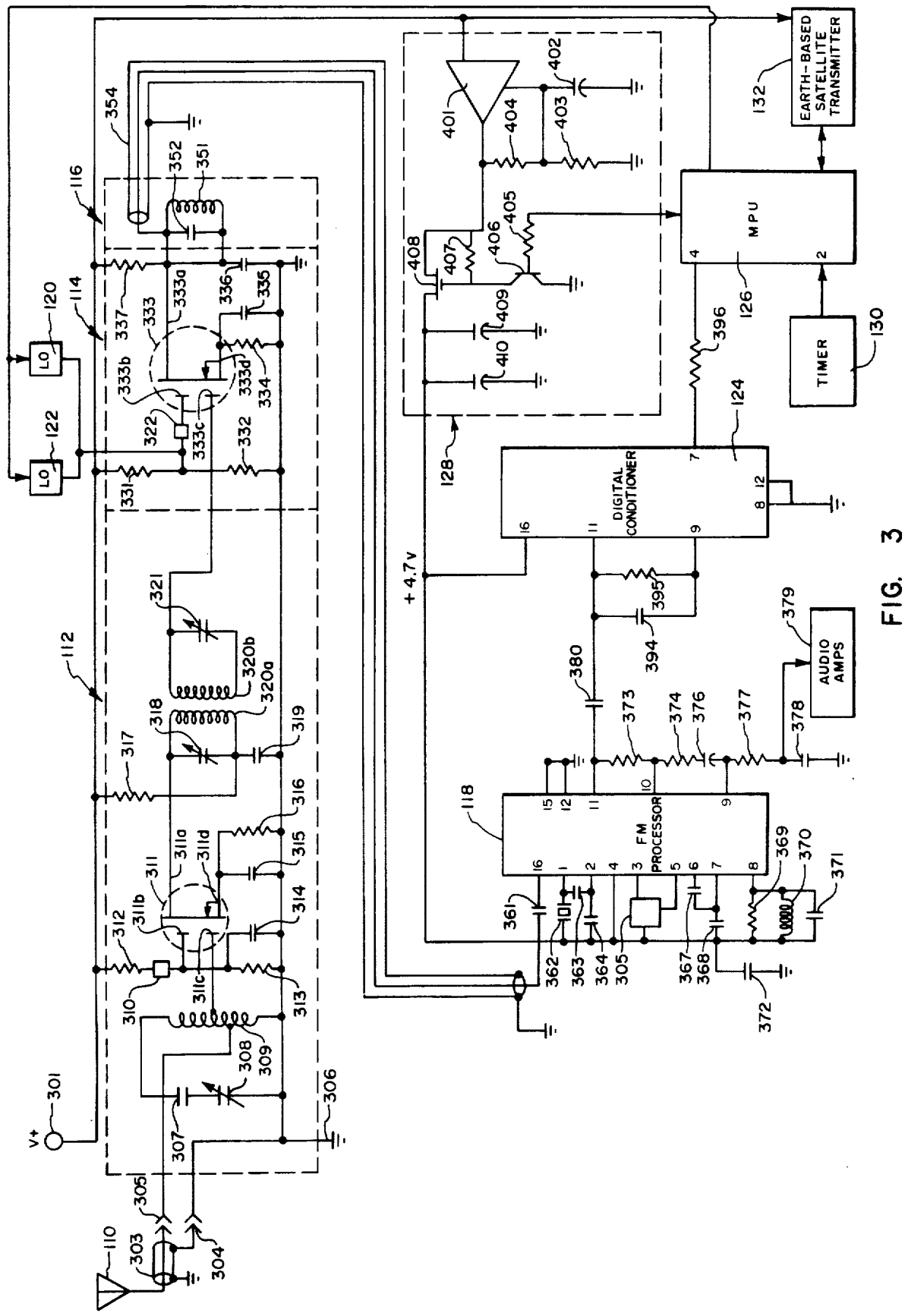
FIGS. 3 and 3A are schematic circuit diagrams of the presently preferred embodiment.

Reference will now be made to the schematic diagram of FIG. 3, which illustrates in detail one example of how the system and method of the present invention may be implemented by one of skill in the art. FIG. 3 is merely illustrative of the presently preferred circuit for the system; other circuit designs could be devised without departing from the spirit and scope of the invention.

The FM processor 118, digital conditioner 124, microprocessor 126 and the timer 130 are commercially available integrated circuits. The function of these circuits may be performed by any configuration of components which would compare the demodulated signal with the stored information representing the unique down-link signal identifying the particular satellite.

In the presently preferred embodiment, digital conditioner 124 in FIG. 1 is an integrated circuit, manufactured by RCA, type 4060, which is a divide-by-sixteen frequency divider. As shown in FIG. 3, the digital conditioner 124 receives the demodulated output from the FM processor 118 at pin 11 with pin 9 tied to pin 11 through a parallel combination of a 51 picofarad capacitor 394 and a 1 megohm resistor 395. Pin 16 of the digital conditioner 124 receives DC power for operation of the integrated circuit. Pins 8 and 12 of digital conditioner 124 are both tied to ground. The digital conditioner 124 provides an output at pin 7 which is slowed to 1/16 of the input frequency. The output of the digital conditioner 124 is applied to the microprocessor 126 at pin 4 through a 100 kilohm resistor 396.

The microprocessor 126 used in the presently preferred embodiment may be a Motorola MC1468705G2/8-bit EPROM microcomputer. The published specifications for the Motorola microprocessor show that at full operating speed, the microprocessor consumes 20 milliwatts at 5 volts, with a corresponding reduction in power consumption when operated at a speed less than its full operating speed of 4 MHz. Furthermore, typical power consumption during stop mode is a very low five microwatts. The microprocessor 126 includes 2106 bytes of ultraviolet erasable, user-programmable read-only memory (UV EPROM).

In the presently preferred embodiment, the programmed instructions for controlling the microprocessor 126 so as to carry out the steps shown in the flow chart of FIG. 2 and also the information representing the selected unique down-link signal are stored in the EPROM of the microprocessor. The information concerning the necessary pin connections for operation and programming, as well as the details concerning the programming of the MC1468705G2 are well-known in the art and can be obtained in the publication *Advance Information, MC1468705G2, CMOS (High-Performance Silicon-Gate) 8-BIT EPROM MICROCOMPUTER* (published by Motorola Semiconductors, 3501 Ed Blustein Blvd., Austin, Tex. 78721) which is incorporated herein by reference.

In the presently preferred embodiment, which is intended for use with the ARGOS satellite system, the stored down-link signal consists of either one of two separate sync signals (see Table 6), each a series of square waves which are easily characterized by conventional digital electronics techniques. The first sync signal is seven cycles of a 1040 Hz square wave, each square wave remaining "high" for 0.48076 milliseconds and then "low" for the same period. The second sync signal consists of seven square waves at 832 peaks per second, one complete cycle of square wave being "high" for 0.72114 milliseconds and "low" for 0.48076 milliseconds. Either of these unique signals may be used by the presently preferred embodiment as a stored signal to identify the ARGOS satellites.

The FM processor 118, the digital conditioner 124 and microprocessor 126 each require a voltage supply of approximately 5 volts, while the radio-frequency amplifier stage (generally designated at 114 in FIG. 3) and the first mixer stage 116 require between 9.6 and 12 volts. The portion of the circuit indicated generally at 128 reduces and regulates the V+ supply (9.6–12 volts) to 4.7 volts with a low shunt current of about 1 milliamp or less. In particular, the base of bipolar junction transistor 406 is connected to the microprocessor 126 through a 1 megohm resistor 405. Transistor 406 is of the type generally designated in the art as a 2N2222A. The collector of transistor 406 is tied to the gate of a field-effect transistor 408. Field-effect transistor 408 is of the type that is generally designated in the art as a VPO-106N3. The drain of transistor 408 provides power to the FM processor 118 and digital conditioner 124 as shown in FIG. 3.

A 100 microfarad capacitor 410 and a 0.1 microfarad capacitor are connected in parallel between the drain of transistor 408 and ground. The gate of transistor 408 is connected to the source of transistor 408 and the output of amplifier 401 through a 100 kilohm resistor 407. Amplifier 401 is of the type designated LM317 and is manufactured by Motorola Semiconductors, Inc. The input to amplifier 401 is tied to the battery power supply (V+), which under normal conditions varies between 9.6 and 12 volts. The values of resistors 404 and 403 are respectively 1.21 kilohm and 3.3 kilohm. Capacitor 402 is a 10 microfarad capacitor.

The radio-frequency stages of the presently preferred embodiment comprise the blocks designated 112 (amplifier), 114 (mixer) and 116 (filter), and FM processor circuit 118. When designing the radio-frequency stages for use in the presently preferred embodiment, it is important to realize the factors which must be considered in order to make a properly functioning device.

First, load impedance presented by antenna 110 is virtually unpredictable and varies widely. Thus, the amplifier 112 must remain unconditionally stable. Second, the strength of the down-link signal input to the radio-frequency amplifier 112 will be in the range of 0.1 to 0.2 microvolts. This low signal strength is due to several conditions. Transmissions by earth-orbiting satellites are inherently weak due to low-powered transmitters aboard the satellites and the distance over which the signal travels. Also, the antenna 110 which is to be used must be able to withstand the rigors that will be encountered in its operating environment. For example, when a PTT is attached to a live animal, the antenna must be compact, very sturdy, and must not unduly interfere with the animal's lifestyle. An antenna meeting the above requirements will generally not be very efficient, particularly when operated in the very high-frequency band, such as is the case with the ARGOS satellite system.

Another factor to be considered in designing the radio-frequency stages is that the frequency at which an earth-orbiting satellite is transmitting will appear to vary in reference to its location on the earth due to the Doppler effect. Since the satellite is constantly moving at approximately 17,000 to 18,000 miles per hour in relation to the earth's surface, there may be a Doppler shift of up to 3.4 kHz at the operating frequencies in question, namely 136.770 MHz and 137.770 MHz.

Still other factors which must be considered when designing the radio-frequency stages for use in the present invention are the aging and temperature-dependent characteristics of the components that are used. Furthermore, atmospheric conditions may also affect the strength of the signal received from the earth-orbiting satellite. Additionally, with regard to the performance of the antenna used with the system, the limitations on the physical size and configuration of the antenna may prevent an antenna with the correct polarization from being used. For example, the polarization used in connection with the APT transmitter antennas on board the ARGOS satellites is right-hand circular. It is very unlikely that a right-hand circular antenna could be suitably adapted for use on a live animal. All of the above considerations point out the importance of careful selection of components and design so as to provide maximum sensitivity of the radio-frequency stages.

In the presently preferred embodiment, the downlink signal received by antenna 110 is conducted to the radio-frequency amplifier statge 112 by a coaxial cable, the shield of the coaxial cable being designated at 303 in FIG. 3. The shield 303 is connected to ground 306. The center conductor of the coaxial cable, indicated at 305, is connected to inductor 309. Inductor 309 is an 8.5 turn, air-core inductor. A first terminal of inductor 309 is tied directly to ground 306 with the second terminal being tied to ground through capacitor 307 and variable capacitor 308. Capacitor 307 has a value of 27 picofarads and variable capacitor 308 has a value that may vary between 1.2 and 10 picofarads. Variable capacitor 308 may be tuned so as to provide maximum signal strength at a first gate 311c of a dual-gate field-effect transistor 311.

Transistor 311 functions to provide a gain of approximately 8–12 dB. A dual-gate field-effect transistor is used in the presently preferred embodiment because it has been found that such a device provides the most desirable operating characteristics including the lowest power consumption when compared to other available devices. A radio-frequency bead 310 is attached to the terminal leading to the second gate 311b of transistor 311 which is also tied to the V+ power supply through resistor 312 which has a value of 150 kilohms. Bead 310 prevents oscillation and improves stability. Resistors 312 and 313 form a voltage divider which establishes the bias voltage for transistor 311, thus controlling the gain of the transistor. Resistor 313 has a value of 100 kilohms while capacitor 314 has a value of 1 nanofarad. Transistor 311 in the presently preferred embodiment is manufactured by RCA and designated by the number 3N200. The source of transistor 311 is tied to its substrate and also tied to ground through the parallel combination of capacitor 315, which has a value of 1 nanofarad and resistor 316 which has a value of 100 ohms.

The radio-frequency signal derived from transistor 311 is applied to a first inductor 320a which is inductively coupled through an air core to a second inductor 320b. Each of the inductors 320a and 320b is a 10.5 turn, air-core inductor. Connected in parallel across inductor 320a is a variable capacitor 318. Variable capacitor 318 exhibits a capacitance between 2 and 8 picofarads. The second terminal of inductor 320a is tied to ground through capacitor 319, which has a value of 1 nanofarad, and to the V+ supply 301 through resistor 317, a 100 ohm resistor. Variable capacitor 321 is connected in parallel across the terminals of conductor 320b, and exhibits a capacitance between 5.5 and 18 picofarads. Another radio-frequency bead 322 is applied to the terminal of the parallel combination of inductor 320b and variable capacitor 321, which carries the radio-frequency signal from the radio-frequency amplifier stage 112 to the first mixer stage 114.

In the first mixer stage 114 transistor 333 is a dual-gate field-effect transistor which in the presently preferred embodiment is manufactured by RCA and is designated by the number 3N205. The radio-frequency signal derived from the parallel combination of inductor 320b and variable capacitor 321 is applied to the first gate of transistor 333. The second gate of transistor 333 is tied to the V+ supply through register 331, a 120 kilohm resistor, and tied to ground through resistor 332, a 15 kilohm resistor. Also, the output of local oscillators 120 and 122 are input to transistor 333 at the second gate 333b.

As explained earlier, while the scope of the invention includes embodiments which comprise a greater or lesser number of local oscillators, two local oscillators are sufficient to provide an embodiment that may be used with the ARGOS satellite system. The source 333d of transistor 333 is tied to the substrate of transistor 333 and to ground through the parallel combination of resistor 334, having a value of 1.5 kilohms, and to capacitor 335, having a value of 1 nanofarad. Also, current-limiting resistor 337, with a value of 100 ohms and bypass capacitor 336, having a value of 10 nanofarads, are connected from the V+ supply 301 to the ground 306.

The output of the first mixer stage 114 is taken from the drain 333a of transistor 333 and applied to a filter stage 116 comprising the parallel combination of capacitor 352 and inductor 351. Capacitor 352 has a capacitance of 50 picofarads while inductor 351 is an air-core inductor using 30 turns of number 30 wire. One terminal of the parallel combination of capacitor 352 and inductor 351 is tied to ground through capacitor 336.

The output of the filter stage 116 is conducted through coaxial cable 354 to the FM processor 118. In the presently preferred embodiment, the FM processor 118 is an integrated circuit manufactured by Motorola Semiconductors, Inc. and is designated by the number MC3361. The FM processor 118 includes the components necessary to provide a second mixing function as well as demodulating and amplification functions, described above.

The radio-frequency signal from the filter stage 116 is applied to pin 16 of FM processor 118 through capacitor 361, capacitor 361 having a value of 0.1 microfarad. Crystal 362 is a 10.245 MHz crystal whose output is applied to pin 1 of FM processor 118. Capacitor 363 ties pins 1 and 2 of FM processor 118 together, and has a value of 68 picofarads. Capacitor 364 ties the $V_{DD}$ supply of 4.7 volts derived from the components included in voltage regulator 128 stage to pin 2 through capacitor 364, which has a value of 220 picofareds. Pin 4 of FM processor 118 is tied directly to the $V_{DD}$ supply. Pins 3 and 5 of FM processor 118 route the output of the second mixer, which is internal to FM processor 118, through a Murata filter 305. Pin 6 is tied to pin 7 through capacitor 367 which has a value of 0.1 microfarad. Pin 7 is then tied to the $V_{DD}$ supply through capacitor 368 which also has a value of 0.1 microfarad. Pin 8 is tied to the $V_{DD}$ supply through the R-L-C parallel combination of resistor 369, having a value of 69 kilohms, inductor 370, comprised of 80 turns of number 34 wire, and capacitor 371, exhibiting a capacitance of 100 picofareds. Additionally, the $V_{DD}$ supply is connected to ground through capacitor 372 which has a value of 0.1 microfarad.

Pins 15 and 12 of FM processor 118 are both tied to ground. The demodulated output of FM processor 118 appears at pin 11. Pin 11 is tied to pin 10 through resistor 373 which has a value of 15 kilohms. Pin 1 is also tied to pin 9 through a series combination of resistor 374 and capacitor 376, having the respective values of 510 ohms and 0.1 microfarad. Pin 9 is then tied to ground through the series combination of resistor 377 and capacitor 378, having values of 8.2 kilohms and 0.01 microfarad, respectively. The output of the FM processor 118 is tied to the digital conditioner 124 through capacitor 380 which has a value of 1 microfarad.

By proper layout and implementation of the circuitry shown in the radio-frequency stages (that is, the RF amplifier stage 112, the first mixer stage 114, the filter stage 116, and the FM-processor 124), the present invention may be provided with a radio-frequency receiver which has sufficient sensitivity so as to provide an adequate demodulated output signal usable by the digital conditioner 124 in response to a down-link signal with as low as 0.1 microvolt signal level.

Figure 3A:
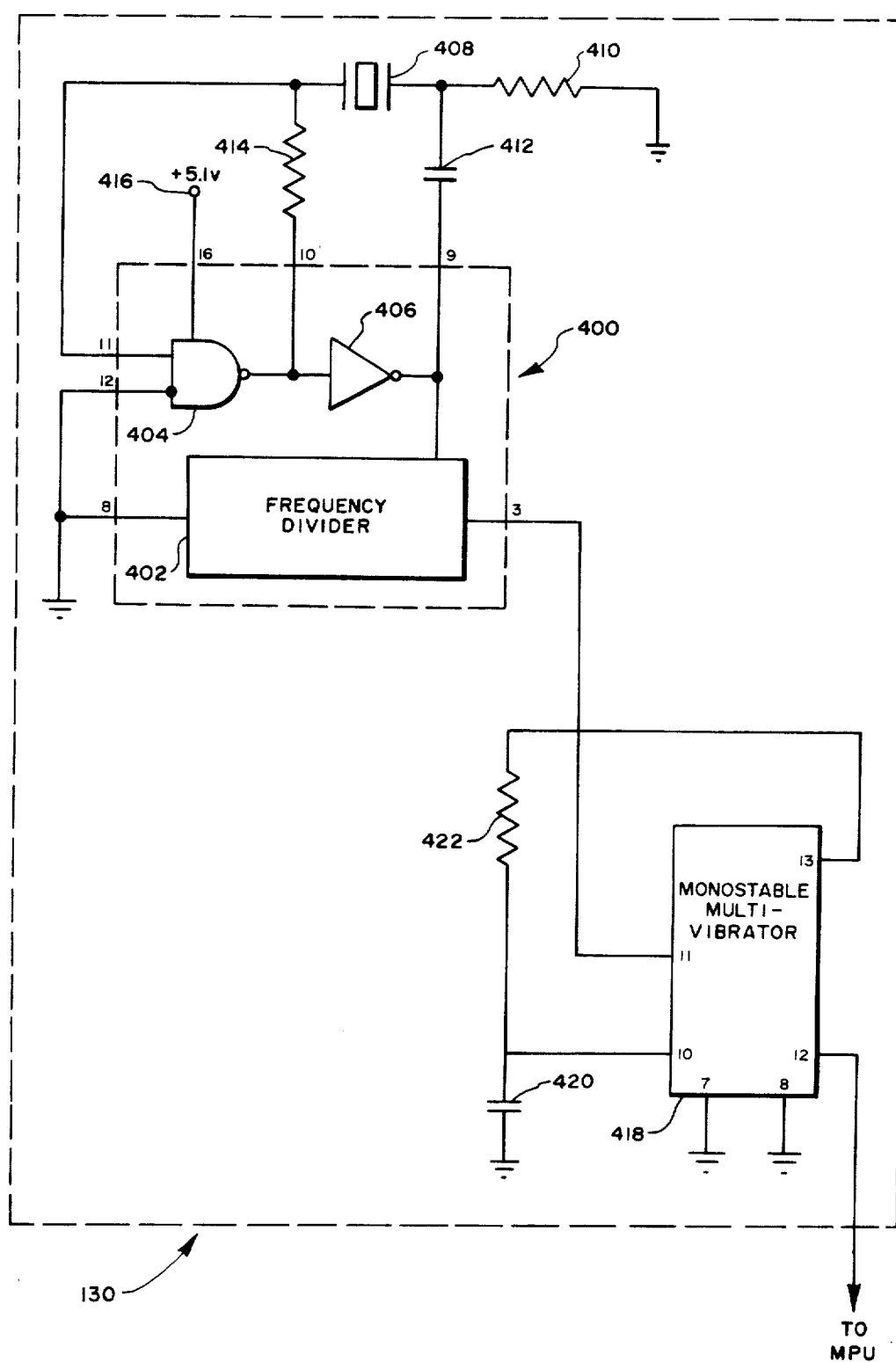

The timer 130 which is used to periodically pulse the microprocessor 126, causing it to check for the presence of the unique down-link signal, is illustrated in greater detail in FIG. 3a. As shown in FIG. 3a, the timer generally designated at 130 comprises principally two integrated circuits generally designated at 400 and indicated at 418. The integrated circuit generally designated by the dashed line shown at 400 is a stage ripple-carry binary counter/divider and oscillator which may be, for example, a Motorola MC 14060 integrated circuit. The integrated circuit includes a frequency divider 402 with external connections by way of pins 8 and and 12 to a NAND gate 404 and inverter 406. Pin 11 of the integrated circuit 400 is connected to a 16.384 kilohertz crystal oscillator 408. The terminals of oscillator 408 are connected through an 8.2 megohm resistor 414 to pin 10 of the integrated circuit and through a 22 picofared capacitor 412 to pin 9. Oscillator 408 is also connected through 330 kilohm resistor 410 to ground. The output of the frequency divider 402 appears at pin 3 which is connected to pin 11 of the monostable multivibrator 418. Pin 13 is connected to pin 10 of the multivibrator 418 through a 100 kilohm resistor 422, and is also connected to a 330 picofared capacitor 420 which is shunted to ground.

In its operation, the frequency divider 402 divides the 16.384 KHz oscillator frequency to provide a 1 Hz pulse which is input to the monostable multivibrator 418. In the presently preferred embodiment, integrated circuit 418 is a one-shot monostable multivibrator that provides a very narrow pulse width adapted for input to the microprocessor 126. Integrated circuit 418 may consist, for example, of a Motorola MC 14013 integrated circuit.

As previously indicated, the pulse which is input to microprocessor 126 at pin 2 from timer 130 is provided at intervals so that the microprocessor 126 periodically checks to determine whether the unique down-link signal is present. In the presently preferred method, timer 130 provides the pulse which causes microprocessor 126 to check for the down-link signal once each second. However, other intervals could be used within the scope of the system and method of the present invention.

The external timer 130 is provided in the presently preferred embodiment of the system and method of the present invention so that microprocessor 126 is able to turn off its internal clock, which serves to further conserve power to provide extended battery life. However, it will be appreciated that other embodiments could be devised which function in connection with the internal clock of the microprocessor rather than external timer 130 as illustrated in the embodiment of FIG. 3.

It should be realized that the present invention may be embodied in other specific forms different from that described above without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A transmitter system for controlling transmissions from a portable battery-powered earth-based transmitter to an orbiting satellite such that said transmissions are sent by said transmitter system only when said system detects a unique down-link signal that indicates when said satellite is within range of said transmitter, said transmitter system comprising:

signal processing means for receiving, amplifying and demodulating said unique down-link signal so as to provide a demodulated signal when said satellite is within range of said transmitter;

transmitting control means electronically connected to said signal processing means, said transmitter control means comprising means for detecting when said unique down-link signal is present, said transmitter control means thereafter turning on said transmitter so that said transmissions are sent by said transmitter only when said unique down-link signal is determined to be present;

means, associated with said transmitter control means, for periodically switching said transmitter control means from a "full-stop" mode to a timed operating mode so that said transmitter control means performs said detection only during said timed operating mode; and battery means, controlled by said transmitter control means, for providing electrical power to said transmitter, to said signal processing means, to said control means, and to said means for periodically switching said transmitter control means, whereby said battery means is switched to a "full on" mode when said transmitter system detects said unique down-link signal and when said satellite is within range of said transmitter.

2. A system as defined in claim 1 wherein said signal processing means comprises:

a receiving antenna and an amplifier connected to said antenna for amplifying said unique down-link signal when it is received by said antenna;

a first mixer connected to said amplifier for providing a first intermediate-frequency signal derived from said unique down-link signal when mixed with an oscillator signal;

an oscillator stage for providing said oscillator signal to said first mixer;

a filter for filtering substantially all signal frequencies except said intermediate-frequency signal of said mixer;

an FM processor circuit connected to said filter, said FM processor circuit comprising means for providing a second intermediate-frequency signal, and means for amplifying and demodulating said second intermediate-frequency signal to derive a demodulated signal; and a digital conditioner circuit connected to said FM processor circuit and comprising means for dividing the frequency of said demodulated signal, and means for shaping said second intermediate-frequency signal to form a square wave signal adapted for digital input to said control means.

3. A system as defined in claim 2 wherein said oscillator stage comprises a plurality of local oscillators.

4. A system as defined in claim 3 wherein each said local oscillator is controlled by said control means such that a separate oscillator signal is input to said first mixer from only one local oscillator at a time.

5. A system as defined in claim 4 wherein said local oscillators are controlled by said control means such that each said separate oscillator signal is input to said first mixer in sequence until said control means either determines the presence of said unique down-link signal or completes said timed operating mode.

6. A transmitter system for controlling transmissions from a portable, battery-powered earth-based transmitter to an orbiting satellite such that said transmissions are sent by said transmitter only when said transmitter system detects a unique down-link signal that indicates when said satellite is within range of said transmitter, said transmitter system comprising:

means for receiving and amplifying said unique down-link signal;

means for generating an intermediate-frequency signal from said amplified down-link signal;

means for filtering said intermediate-frequency signal to remove essentially all other frequencies except said intermediate-frequency signal;

means for generating a demodulated signal from said filtered intermediate-frequency signal;

transmitter control means comprising means for storing information representing said unique down-link signal, and further comprising means for comparing said demodulated signal with said stored information so as to determine when they match, thereby indicating when said unique down-link signal is present, said transmitter control means thereafter turning on said transmitter so that said transmissions are sent by said transmitter only when said unique down-link signal is determined to be present;

means, associated with said transmitter control means, for periodically switching said transmitter control means from a "full-stop" mode to a timed operating mode so that said transmitter control means performs said comparison only during said timed operating mode; and battery means, controlled by said transmitter control means, for providing power to said transmitter and to each of the means in the transmitter system, whereby said battery means is switched to a "full on" mode when said transmitter system detects said unique down-link signal and when said satellite is within range of said transmitter.

7. A system as defined in claim 6 wherein said means for receiving and amplifying said unique down-link signal comprises a receiving antenna and an RF amplifier stage connected to said antenna.

8. A system as defined in claim 7 wherein said RF amplifier stage comprises a dual-gate field-effect transistor.

9. A system as defined in claim 6 wherein said means for generating said intermediate-frequency signal from said amplified down-link signal comprises:

a first mixer stage; and an oscillator stage connected to said first mixer stage for providing an oscillator signal which is mixed with said amplified down-link signal to provide said intermediate-frequency signal.

10. A system as defined in claim 9 wherein said oscillator stage comprises a plurality of local oscillators each providing a separate oscillator signal for input to said first mixer stage, and wherein said local oscillators are each controlled by said control means such that each said separate oscillator signal is input to said first mixer stage in sequence until said control means either determines the presence of said unique down-link signal or completes said timed operating mode.

11. A system as defined in claim 10 wherein said first mixer stage comprises a dual-gate field-effect transistor.

12. A system as defined in claim 6 wherein said means for filtering said intermediate-frequency signal comprises a tuned transformer.

13. A system as defined in claim 6 wherein said means for generating said demodulated signal from said filtered intermediate-frequency signal comprises an integrated circuit comprising means for providing a second intermediate-frequency signal derived from said first intermediate-frequency signal, and means for amplifying and demodulating said second intermediate-frequency signal.

14. A system as defined in claim 6 further comprising means for digitally conditioning said demodulated signal before said demodulated signal is input to said control means for comparison with said stored information.

15. A system as defined in claim 14 wherein said means for digitally conditioning said demodulated signal comprises an integrated circuit comprising means for dividing the frequency of said demodulated signal and means for shaping said demodulated signal to form a square wave signal adapted for digital input to said control means.

16. A system as defined in claim 6 wherein said control means comprises a microprocessor comprising an erasable programmable read-only memory.

17. A system for controlling transmissions from a portable, battery-powered earth-based transmitter to an orbiting satellite such that said transmissions are sent by said transmitter only when said system detects a unique down-link signal that indicates when said satellite is within range of said transmitter, said system comprising:

a receiving antenna and an amplifier stage connected to said antenna for amplifying said unique down-link signal when received by said antenna;

a first mixer stage connected to said amplifier stage for mixing said amplified down-link signal with an oscillator signal so as to provide a first intermediate-frequency signal;

a plurality of local oscillators connected to said first mixer stage, each said local oscillator providing a separate oscillator signal for input to said first mixer stage;

a filter connected to said first mixer stage for filtering said first intermediate-frequency signal in order to remove essentially all other signal frequencies except said first intermediate-frequency signal;

an FM processor integrated circuit connected to said filter, said FM processor integrated circuit comprising means for providing a second intermediate-frequency signal derived from said first intermediate-frequency signal, and means for amplifying and demodulating said second intermediate-frequency signal;

a digital conditioner integrated circuit connected to said FM processor integrated circuit, said digital conditioner integrated circuit comprising means for dividing the frequency of said second intermediate-frequency signal, and means for shaping said second intermediate-frequency signal to form a square wave signal adapted for digital input;

control means connected to said digital conditioner integrated circuit, said control means comprising means for digitally storing information representing said unique down-link signal, and means for comparing said digitally conditioned square wave signal with said stored information so as to determine when said unique down-link signal is present, said control means thereafter turning on said transmitter so that said transmissions are sent by said transmitter only when said unique down-link signal is determined to be present by said control means;

battery means for providing electrical power to said amplifier stage, to said first mixer stage, to said FM processor integrated circuit, to said digital conditioner integrated circuit and to said control means; and means for periodically switching said control means from a "full-stop" mode to a timed operating mode so that said control means performs said comparison only during said timed operating mode.

18. A system as defined in claim 17 wherein said local oscillators are controlled by said control means such that each said separate oscillator signal is input to said first mixer stage in sequence until said control means either determines the presence of said unique down-link signal or completes said timed operating mode.

19. A method for controlling transmissions from a portable, battery-powered earth-based transmitter to an orbiting satellite such that said transmission are sent by said transmitter only when said system detects a unique down-link signal that indicates when said satellite is within range of said transmitter, said method comprising the steps of:

receiving and amplifying at said transmitter said unique down-link signal;

demodulating at said transmitter said amplified down-link signal;

storing in a microprocessor at said transmitter information representing said unique down-link signal;

inputting said demodulated down-link signal to said microprocessor, and said microprocessor thereafter comparing said demodulated down-link signal with said stored information so as to determine when they match, thereby indicating when said down-link signal is present;

normally maintaining said microprocessor in a "full-stop" mode wherein said microprocessor is essentially turned off so that it does not perform said comparison;

periodically switching said microprocessor from said "full-stop" mode to a timed operating mode so that said microprocessor only performs said comparison during said timed operating mode; and said microprocessor turning on said battery-powered transmitter so that said transmissions are sent only when said unique down-link signal is determined to be present by said microprocessor.

20. A method as defined in claim 19 wherein said demodulating step is preceded by the steps of:

mixing said amplified down-link signal with an oscillator signal so as to provide a first intermediate-frequency signal; and filtering said first intermediate-frequency signal to remove essentially all signal frequencies except said first intermediate-frequency signal.

21. A method as defined in claim 20 wherein said demodulating step comprises the steps of:

processing said first intermediate-frequency signal so as to provide a second intermediate-frequency signal;

amplifying said second intermediate-frequency signal; and thereafter demodulating said second intermediate-frequency signal.

22. A method as defined in claim 19 wherein said demodulating step is followed by the step of digitally conditioning said demodulated down-link signal so as to adapt said demodulated down-link signal for digital input to said microprocessor.

23. A method as defined in claim 23 wherein said digital conditioning step comprises the steps of:

dividing the frequency of said demodulated down-link signal; and shaping said demodulated down-link signal to form a square wave signal adapted for said digital input to said microprocessor.

24. A method as defined in claim 19 further comprising the steps of:

generating a plurality of oscillator signals;

mixing in sequence each said oscillator signal with said amplified down-link signal until said microprocessor either determines the presence of said unique down-link signal or completes said timed operating mode.

25. A method of controlling transmissions from a portable, battery-powered earth-based transmitter to an orbiting satellite such that said transmissions are sent by said transmitter only when said system detects a unique down-link signal that indicates when said satellite is within range of said transmitter, said method comprising the steps of:

receiving and amplifying at said transmitter said unique down-link signal;

generating an intermediate-frequency signal at said transmitter from said amplified down-link signal;

filtering said intermediate-frequency signal to remove essentially all other signal frequencies except said intermediate-frequency signal;

generating a demodulated signal at said transmitter from said filtered intermediate-frequency signal;

storing in a microprocessor at said transmitter information representing said unique down-link signal;

inputting said demodulated down-link signal to said microprocessor, said microprocessor thereafter comparing said demodulated down-link signal with said stored information so as to determine when they match, thereby indicating when said down-link signal is present;

maintaining said microprocessor in a normally "full-stop" mode wherein said microprocessor is essentially turned off;

periodically switching said microprocessor from said "full-stop" mode to a timed operating mode so that said microprocessor performs said comparison only during said timed operating mode; and turning on said battery-operated transmitter when said unique down-link signal is determined to be present by said microprocessor.

26. A method as defined in claim 25 wherein said step of generating said intermediate-frequency signal from said amplified down-link signal comprises the steps of:
generating a plurality of oscillator signals; and
mixing in sequence each said oscillator signal with said amplified down-link signal until said microprocessor either determines that said unique down-link signal is present or that said timed operating mode is completed.

27. A transmitter system for controlling transmissions from a portable battery-powered earth-based transmitter to an orbiting satellite such that said transmissions are sent by said transmitter only when said system detects a unique down-link signal that indicates when said satellite is within range of said transmitter, said transmitter system comprising:
signal processing means for receiving, amplifying and demodulating at said transmitter said unique down-link signal so as to provide a demodulated signal when said satellite is within range of said transmitter;
digital conditioning means connected to said signal processing means, said digital conditioning means comprising means for dividing the frequency and shaping the waveform of the signal output from said signal processing means to form a square wave;
control means connected to said digital conditioning means, said control means comprising means for detecting when said unique down-link signal is present, said control means thereafter turning on said transmitter so that said transmissions are sent by said transmitter only when said unique down-link signal is determined to be present; and
battery means for providing electrical power to said transmitter, to said signal processing means and to said control means, whereby said battery means is switched to a "full on" mode when said transmitter system detects a unique down-link signal that indicates when said satellite is within range of said transmitter.

28. A transmitter system for controlling transmissions from a portable, battery-powered earth-based transmitter to an orbiting satellite such that said transmission are sent by said transmitter only when said system detects a unique down-link signal that indicates when said satellite is within range of said transmitter, said transmitter system comprising:
means for receiving and amplifying said unique down-link signal;
means for generating an intermediate-frequency signal from said amplified down-link signal;
means for filtering said intermediate-frequency signal to remove essentially all other frequencies except said intermediate-frequency signal;
means for generating a demodulated signal from said filtered intermediate-frequency signal;
means for dividing the frequency and shaping the waveform of said demodulated signal;
control means comprising means for storing information representing said unique down-link signal, and further comprising means for comparing said demodulated signal with said stored information so as to determine when they match, thereby indicating when said unique down-link signal is present, said control means thereafter turning on said transmitter so that said transmissions are sent by said transmitter only when said unique down-link signal is determined to be present;
battery means for providing power to said transmitter and to each said means; and
means for periodically switching said control means from a "full-stop" mode to a timed operating mode so that said control means performs said comparison only during said timed operating mode.

29. A method for controlling transmissions from a portable, battery-powered earth-based transmitter to an orbiting satellite such that said transmissions are sent by said transmitter only when said system detects a unique down-link signal that indicates when said satellite is within range of said transmitter, said method comprising the steps of:
receiving and amplifying said unique down-link signal;
demodulating said amplified down-link signal;
dividing the frequency of said demodulated down-link signal;
shaping said demodulated down-link signal to form a square wave signal adapted for digital input to a microprocessor;
storing in said microprocessor information representing said unique down-link signal;
inputting said demodulated down-link signal to said microprocessor, and said microprocessor thereafter comparing said demodulated down-link signal with said stored information so as to determine when they match, thereby indicating when said down-link signal is present; and
said microprocessor thereafter turning on said transmitter so that said transmissions are sent only when said unique down-link signal is determined to be present by said microprocessor.

* * * * *

UNITED STATES PATENT AND TRADEMARK OFFICE
CERTIFICATE OF CORRECTION

PATENT NO. : 4,704,735

DATED : November 3, 1987

INVENTOR(S) : Mavin W. Swapp et al.

It is certified that error appears in the above-identified patent and that said Letters Patent is hereby corrected as shown below:

Columns 5-6, table 4, "(1) Equivalent output Digital Data Rate is 4610 words/second" should be --(1) Equivalent output Digital Data Rate is 4160 words/second--

Column 18, line 45, "picofareds" should be --picofarads--

Column 26, line 47, "transmission are" should be --transmissions are--

Signed and Sealed this

Twenty-eighth Day of June, 1988

Attest:

DONALD J. QUIGG

Attesting Officer

Commissioner of Patents and Trademarks